United States Patent
Chung et al.

(10) Patent No.: US 7,184,374 B2
(45) Date of Patent: Feb. 27, 2007

(54) LAYER JUMP CONTROL DEVICE AND METHOD OF HIGH-SPEED OPTICAL DRIVE

(75) Inventors: Yi-Ren Chung, Taipei (TW); Yuh-Long Yeh, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 610 days.

(21) Appl. No.: 10/729,981

(22) Filed: Dec. 9, 2003

(65) Prior Publication Data

US 2005/0052962 A1 Mar. 10, 2005

(30) Foreign Application Priority Data

Sep. 9, 2003 (TW) .............................. 92124935 A

(51) Int. Cl.
*G11B 7/00* (2006.01)

(52) U.S. Cl. .............................. 369/44.27; 369/44.25; 369/94; 369/44.29

(58) Field of Classification Search ............. 369/44.27, 369/44.25, 44.26, 94, 53.19
See application file for complete search history.

(56) References Cited

U.S. PATENT DOCUMENTS 5,412,640 A * 5/1995 Fuldner et al. ............. 369/100
2003/0076755 A1 4/2003 Chiang et al. ........... 369/44.27

* cited by examiner

*Primary Examiner*—Nabil Hindi
(74) *Attorney, Agent, or Firm*—Troxell Law Office, PLLC

(57) ABSTRACT

A real-time wobble detector and an adaptive layer distance balancing calculator are added in a layer jump control device of a high-speed optical drive to solve failure and instability caused by the wobble effect of the optical drive during layer jump. A layer jump control method of the optical drive is also provided.

21 Claims, 5 Drawing Sheets

LAYER JUMP CONTROL DEVICE AND METHOD OF HIGH-SPEED OPTICAL DRIVE

FIELD OF THE INVENTION

The present invention relates to a layer jump control device and method of a high-speed optical drive and, more particularly, to a layer jump control device and method for dual layer optical discs.

BACKGROUND OF THE INVENTION

Common optical discs can be classified into two categories according to the number of layers: single layer or dual layer. Single layer optical discs include CD, VCD, DVD-5 and DVD-10 discs. Dual layer optical discs include DVD-9, DVD-18 and SACD (super audio compact disk) discs. When an optical drive wants to read dual layer optical discs, the pick-up head of the optical drive should be able to move the laser light spot between two different layers. Therefore, a layer jump process is required to let laser light spot move from an initial layer to another target layer.

The two recording layers of a dual layer optical disc are usually called layer 0 and layer 1. The object of a layer jump process is to let the laser light spot leave from layer 0 to layer 1 or vice versa. Generally speaking, the control force involving a layer jump process can be divided into three parts: a control force moving the pick-up head from a natural equilibrium position to an initial layer; a kick force letting the pick-up head leave from the initial layer; and a brake force keeping the pick-up head in the target layer.

This conventional layer jump control method has its problems. The distance between the two recording layers of dual layer optical discs like DVD-9, DVD-18 and SACD is 55±15 um. The linear control region of each layer is ±1 um. Obviously, the linear control region is very small, but the variation of layer distance between different recording layers is comparatively large. Therefore, if the same control force, kick force and brake force are used to perform the same layer jump process when the natural equilibrium position of a lens is used as the jump position, the problem of unsuccessful layer jump may occur for some optical discs.

U.S. Pub. App. No. 2003/0076755 has proposed a solution to this problem. In this method, as shown in FIG. 1, the whole layer jump process is divided into four processes: a kicking process, a holding process, a braking process and a waiting process. This method is mainly characterized in that a focusing control signal is processed by a low-pass filter to produce a layer distance balancing signal. When a layer jump control signal is received to start a layer jump process, the produced layer distance balancing signal plus a kicking signal and a braking signal is used as the basis. Each time, the layer jump process lets the lens jump from a new natural equilibrium position to a target layer. The whole layer jump process will be simpler and easily controlled.

The main drawback of this method is that it can't handle the wobble effect caused by high-speed rotation of optical discs. Optical discs will wobble up and down relative to the natural balanced point of the lens due to bad positioning or bad manufacturing of optical disc.

For optical discs at low rotation speed, the wobble effect is a low-frequency response. For instance, the wobble period of a 2X DVD drive is about 21.7 ms. The layer jump process is comparatively fast, having a period of about 1.4 ms. Therefore, the wobble effect won't affect natural balance of lens for layer jump process at low rotation speed. Therefore, the produced layer distance balancing signal after the low-pass filter is still useful for wobble at low rotation speed.

FIG. 2 shows variation of the natural equilibrium position of lens for wobble at high rotation speed. For a 12X DVD drive, the wobble period is about 9.3 ms. Vibration of the DVD drive itself will also intensify the wobble effect of optical disc. As shown in FIG. 2, the control force of lens will vary along with the wobble period. The shorter the wobble period, the influence of wobble effect upon the layer jump process can't be neglected more. The control force of natural equilibrium position of lens during the layer jump process is not equal to that before layer jump, resulting in the existence of an inertial acceleration during the layer jump process. The magnitude of this acceleration depends on the jump point of lens from start. The control method of the above disclosures will result in easy failure and instability of layer jump of DVD disc.

SUMMARY OF THE INVENTION

The object of the present invention is to provide a layer jump control device and method of high-speed optical drive.

The present invention is characterized in that a real-time wobble detector is added in. The wobble period can be defined according to the present rotation speed of a spindle motor to detect and renew the magnitude of wobble in each wobble period.

The present invention is also characterized in that an adaptive layer distance balancing calculator is added in. The optimum layer jump start position can be found according to the magnitude of wobble to output a layer distance balancing control force, thereby solving problems caused by the wobble effect at high rotation speed.

The various objects and advantages of the present invention will be more readily understood from the following detailed description when read in conjunction with the appended drawing, in which:

DETAILED DESCRIPTION OF THE PREFERRED EMBODIMENTS

Figure 3:
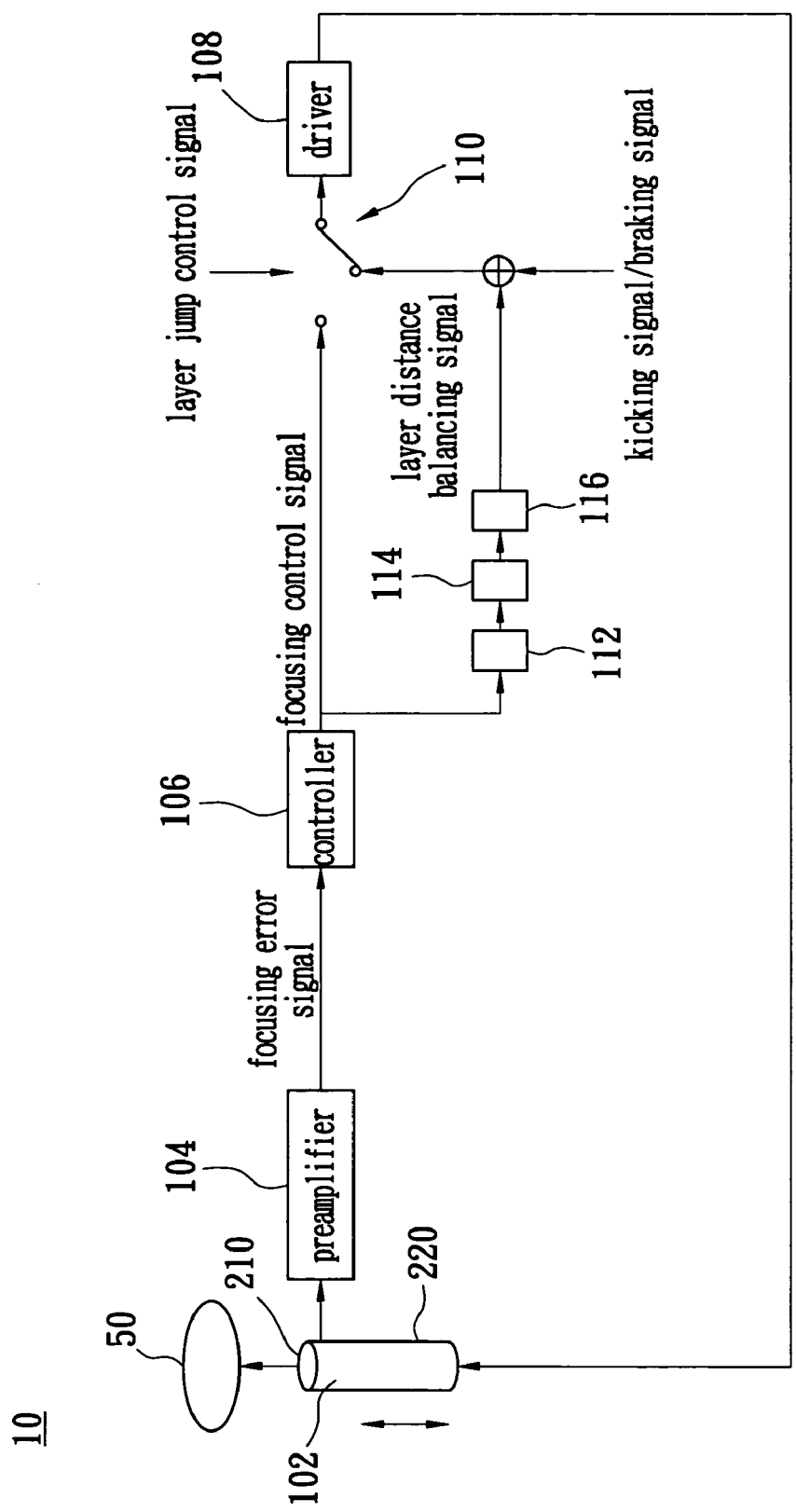
FIG. 3 is a block diagram of the layer jump control device of the present invention.

As shown in FIG. 3, a layer jump control device 10 comprises a pick-up head 102, a preamplifier 104, a controller 106, a driver 108, a switch 110, a low-pass filter 112, a real-time wobble detector 114 and an adaptive layer distance balancing calculator 116.

The pick-up head 102 has a lens 210 for reading a DVD disc 50 and a voice coil motor 220. The pick-up head 102 can drive the voice coil motor 220 to vertically move the lens 210 according to a driving control force. The preamplifier 104 can produce a focusing error signal according to the control result of the pick-up head 102. The controller 106 can receive and process the focusing error signal to produce a focusing control signal. After the focusing control signal is processed by the low-pass filter 112, the real-time wobble detector 114 and the adaptive layer distance balancing calculator 116, a layer distance balancing signal will be produced. The driver 108 is used to output the driving control force to the pick-up head 102.

The switch 110 is used to control whether a layer jump process is to be performed or not. When there is no layer jump process, the switch 110 will let the focusing control signal be directly sent to the driver 108. If there is a layer jump process, the switch 110 will be connected to the adaptive layer distance balancing calculator 116. The sent layer distance balancing signal matched with a kicking signal and a braking signal will be inputted to the driver 108.

Before the layer jump, the outputted focusing error signal of the preamplifier 104 will be kept at a certain value. At this time, the switch 110 is connected to the controller 106. The focusing control signal produced by the controller 106 can control the driver 108 to produce an appropriate driving control force for holding the lens 210 at the original layer. That is, the laser light spot will be kept at the original layer (layer 0 or layer 1). Because of difference of layer distance and possible wobble effect of the DVD disc 50, the focusing control signal may vary continually.

Simultaneously, the focusing control signal is sent to the low-pass filter 12, the real-time wobble detector 114 and then the adaptive layer distance balancing calculator 116 to produce a continually varying layer distance balancing signal. The main function of the low-pass filter 112 is to separate out low-frequency components in the focusing control signal and then send to the real-time wobble detector 114.

Figure 4:
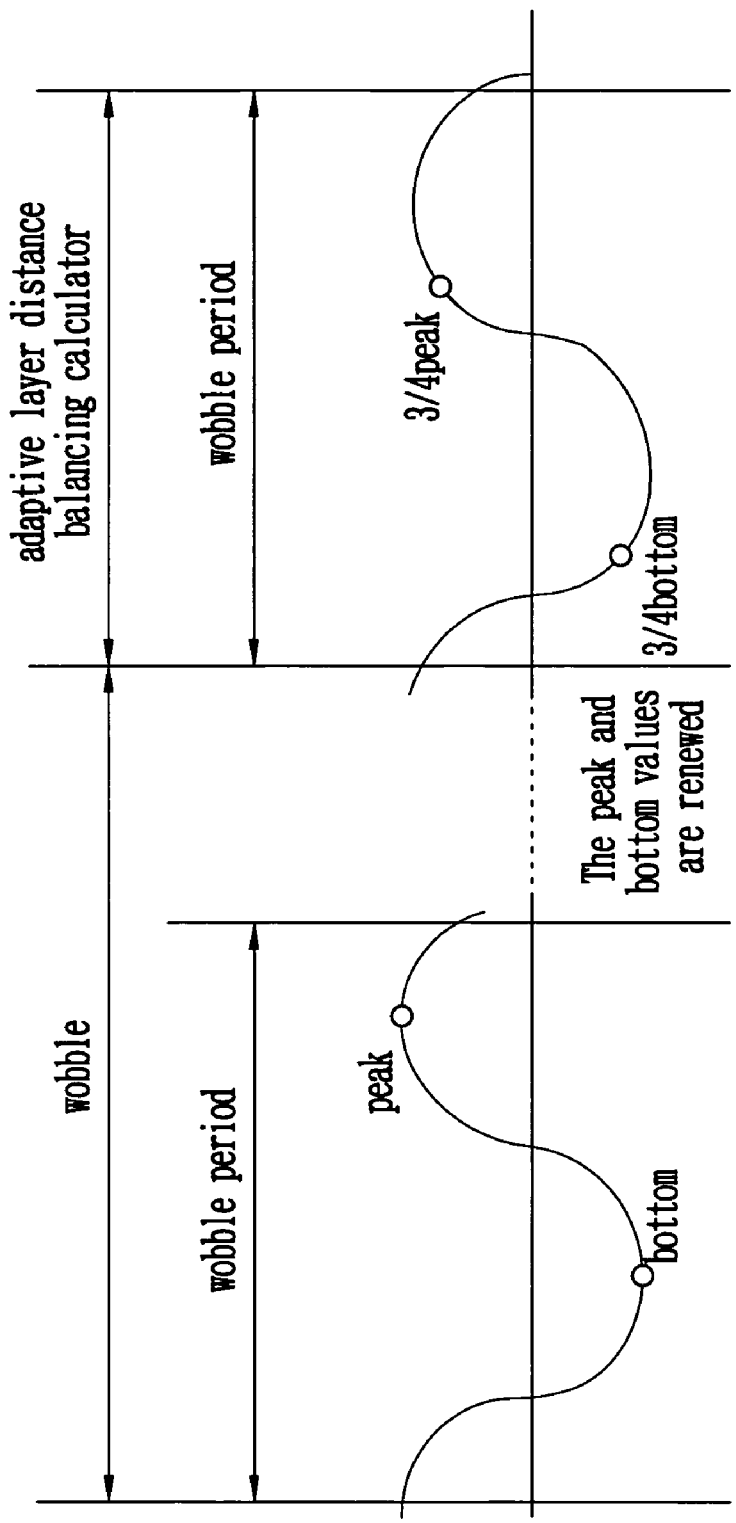
FIG. 4 is a diagram showing the function of the present invention to a wobble signal.

The real-time wobble detector 114 will measure the magnitude and period of wobble of the whole system to determine the optimum layer jump time and position when the wobble effect needs to be taken into consideration. Common DVD drives or optical discs will have an obliquity to cause inconsistent wobble effects at inner or outer circles. Therefore, compensation for the inner or outer circles won't work. A real-time wobble detection mechanism is required instead. The real-time wobble detector 114 of the present invention will define the wobble period according to the present rotation speed of a spindle motor to detect and renew the magnitude of wobble in each wobble period, as shown in FIG. 4. The magnitude of wobble will be outputted to the adaptive layer distance balancing calculator 116 to determine the optimum position for layer distance balance as the layer jump start point to overcome the influence of the wobble effect upon layer jump.

The adaptive layer distance balancing calculator 116 will refer to the previous wobble period of the real-time wobble detector 114 when a layer jump command begins, and then base on this magnitude to choose a control force corresponding to three fourths of the peak or bottom value as the layer jump start position. The selected three fourths of the peak or bottom value is the point entering the gradual region of the wobble period, as shown in FIG. 4. This is because the inertial acceleration of the whole lens 210 will be minimum at the period of peak or bottom when the wobble effect happen. The magnitude of the control force is approximately a constant value in a wobble period. Three fourths of the peak or bottom value is chosen due to a phase delay after the control force is processed by the low-pass filter 112.

If a layer jump control signal is inputted to the switch, a layer jump process begins. At this time, the switch 110 will be connected to the adaptive layer distance balancing calculator 116, which will output an appropriate layer distance balancing control signal. The layer distance balancing control signal matched with the kicking signal and the braking signal can effectively solve problems of the wobble effect at high rotation speeds.

Figure 5:
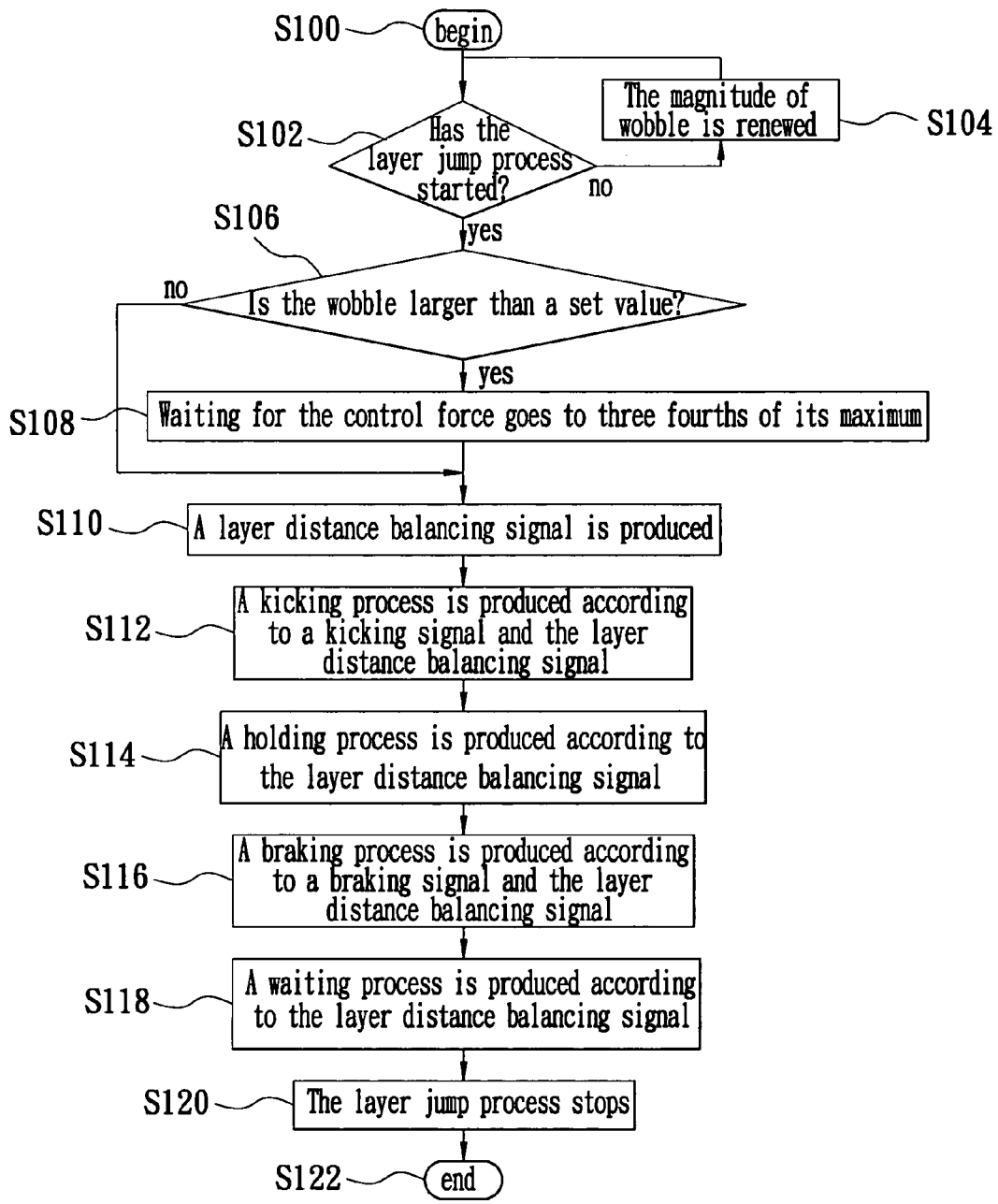
FIG. 5 is a flowchart of the layer jump control method of the present invention.

FIG. 5 is a flowchart of the layer jump control method of the present invention. First, the optical drive begins to operate (S100). The layer jump control device determines whether the layer jump process has started according to the existence of the input of a layer jump control signal (S102). If the layer jump process hasn't started yet, the real-time wobble detector 114 will be used to continually detect and renew the magnitude of wobble in each wobble period (S104). If a layer jump process begins, whether the wobble is larger than a set value will be checked (S106). This set value is about between −0.125 to 0.125 mm. For wobble at low rotation speeds, the wobble will be smaller than the set value so that the output of the low-pass filter 112 can be directly used as the layer distance balancing signal (S110). For wobble at high rotation speeds, the wobble will be larger than the set value. At this time, it is necessary to use the adaptive layer distance balancing calculator 116 to select a control force corresponding to three fourths of the peak or bottom value as the layer jump start position according to the magnitude of wobble obtained by the real-time wobble detector 114 (S108). The layer distance balancing signal is then produced (S110).

Figure 1:
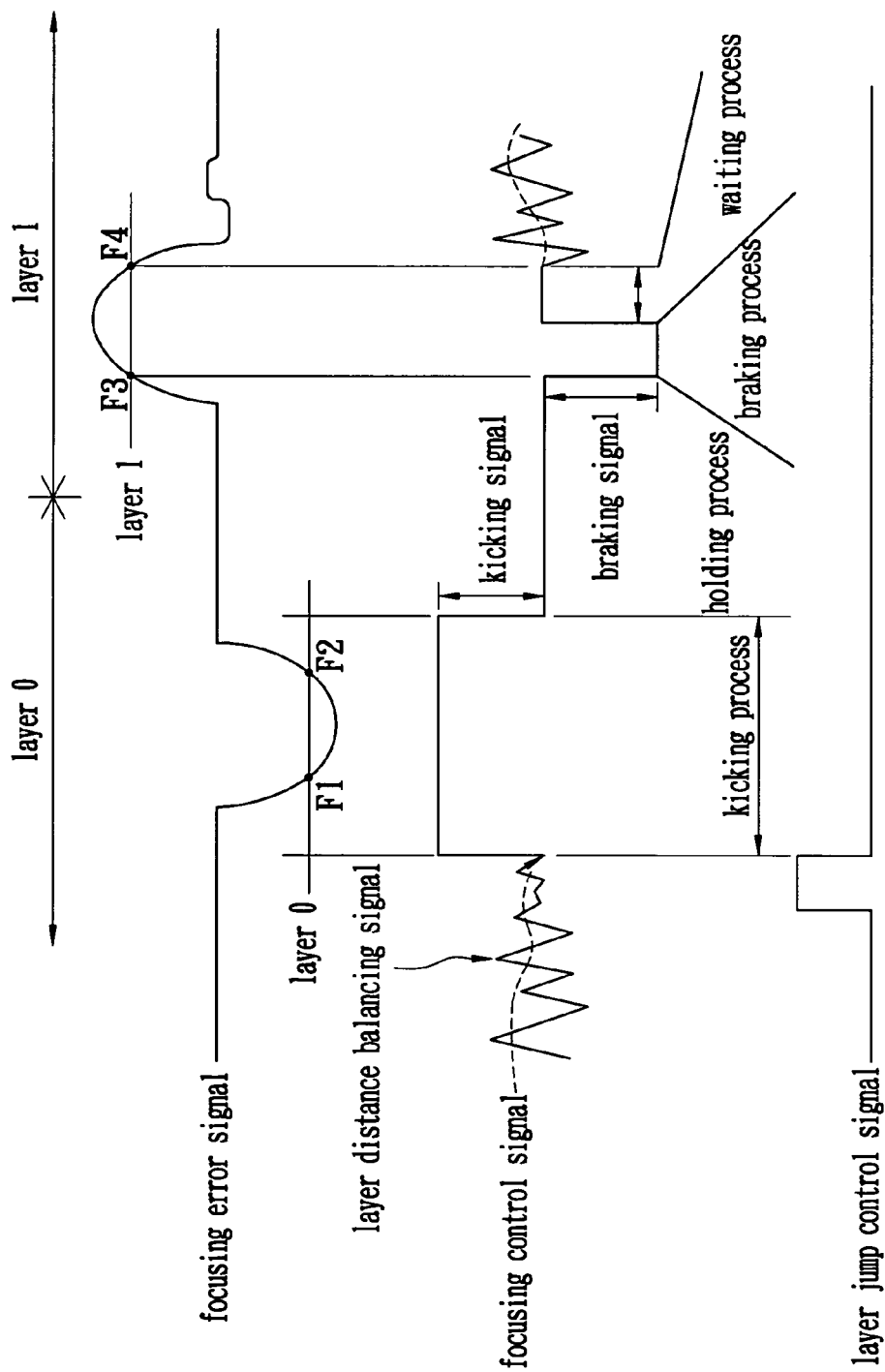
FIG. 1 is a diagram showing a focusing error signal and a focusing control signal of the layer jump process in the prior art.
Figure 2:
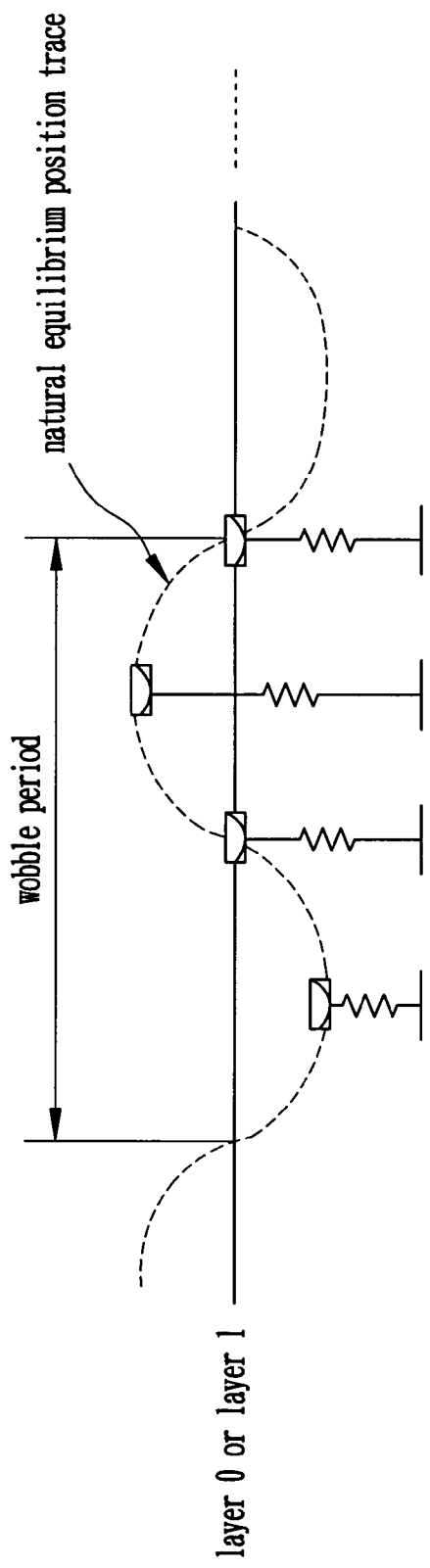
FIG. 2 is a diagram showing variation of the natural equilibrium position of lens for wobble at high rotation speed.

Next, the layer distance balancing signal is sent to an adder, and the kicking signal is sent to driver 108 to produce a kicking process shown in FIG. 1 (S112). Whether the laser light spot leaves the original layer can be made sure through check points F1 and F2 of the focusing error signal. After the kicking process, the kicking signal stops, and the driver 108 is only controlled by the layer distance balancing signal to perform a holding process (S114) to let the lens 210 continue to move to the target layer. Whether the holding process is finished can be checked through a braking check point F3 of the focusing error signal shown in FIG. 1.

After the focusing error signal passes F3, the pick-up head 102 has come near the linear controlled area of the target layer. The braking signal can be added in the layer distance balancing signal to perform a braking process (S116). After the braking process, the lens 210 doesn't necessarily enter the linear controlled area of the target layer. In order to avoid failure of layer jump, the layer distance balancing signal can be used for controlling to perform a waiting process (S118). Whether the waiting process is finished or not can be checked by a braking check point F4 of the focusing error signal shown in FIG. 1. The layer jump process then stops (S120), and the whole process finally ends (S122).

To sum up, the present invention has the following characteristics.

1. A real-time wobble detector is added in. The wobble period can be defined according to the present rotation speed of a spindle motor to detect and renew the magnitude of wobble in each wobble period.
2. An adaptive layer distance balancing calculator is added in. The optimum layer jump start position can be found according to the magnitude of wobble to output a layer distance balancing control force, thereby solving problems caused by the wobble effect at high rotation speed.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A layer jump control device of a high-speed optical drive for controlling the layer jump process of said optical drive, said device comprising:
a low-pass filter used to receive a focusing control signal and output low-frequency components of said focusing control signal;
a real-time wobble detector connected to said low-pass filter and used to detect and renew the magnitude of wobble in each wobble period and output a peak value and a bottom value of wobble; and
an adaptive layer distance balancing calculator connected to said real-time wobble detector and used to determine a layer jump start position and output a layer distance balancing signal.

2. The layer jump control device of high-speed optical drive as claimed in claim 1 further comprising:
a pick-up head having a lens and a voice coil motor, said pick-up head driving said voice coil motor to vertically move said lens according to a driving control force;
a preamplifier used to produce a focusing error signal;
a controller used to receive said focusing error signal and produce said focusing control signal; and
a driver used to output said driving control force.

3. The layer jump control device of high-speed optical drive as claimed in claim 1, wherein said layer jump start position is a gradual position of wobble period near said peak value.

4. The layer jump control device of high-speed optical drive as claimed in claim 3, wherein said gradual position is three fourths of said peak value.

5. The layer jump control device of high-speed optical drive as claimed in claim 1, wherein said layer jump start position is a gradual position of wobble period near said bottom value.

6. The layer jump control device of high-speed optical drive as claimed in claim 5, wherein said gradual position is three fourths of said bottom value.

7. The layer jump control device of high-speed optical drive as claimed in claim 1, wherein said optical drive is a DVD drive.

8. A layer jump control device of high-speed optical drive for controlling the layer jump process of an optical drive, said device comprising:
a low-pass filter used to receive a focusing control signal and output low-frequency components of said focusing control signal;
a real-time wobble detector connected to said low-pass filter and used to detect and renew the magnitude of wobble in each wobble period and output a peak value and a bottom value of wobble;
an adaptive layer distance balancing calculator connected to said real-time wobble detector and used to determine a layer jump start position and output a layer distance balancing signal;
a pick-up head having a lens and a voice coil motor, said pick-up head driving said voice coil motor to vertically move said lens according to a driving control force;
a preamplifier used to produce a focusing error signal;
a controller used to receive said focusing error signal and produce said focusing control signal; and
a driver used to output said driving control force.

9. The layer jump control device of high-speed optical drive as claimed in claim 8, wherein said layer jump start position is a gradual position of wobble period near said peak value.

10. The layer jump control device of high-speed optical drive as claimed in claim 9, wherein said gradual position is three fourths of said peak value.

11. The layer jump control device of high-speed optical drive as claimed in claim 8, wherein said layer jump start position is a gradual position of wobble period near said bottom value.

12. The layer jump control device of high-speed optical drive as claimed in claim 11, wherein said gradual position is three fourths of said bottom value.

13. The layer jump control device of high-speed optical drive as claimed in claim 8, wherein said optical drive is a DVD drive.

14. A layer jump control method of a high-speed optical drive, said optical drive comprising a low-pass filter, a real-time wobble detector, an adaptive layer distance balancing calculator, an pick-up head, a preamplifier and a controller, said method comprising the steps of:
using said real-time wobble detector to continually detect and renew the magnitude of wobble in each wobble period before layer jump and then output a peak value and a bottom value of wobble;
determining whether the magnitude of wobble is larger than a set value when layer jump begins;
using a layer distance balancing signal to perform a layer jump process;
using the output of said low-pass filter as said layer distance balancing signal if the magnitude of wobble is not larger than said set value; and
using said adaptive layer distance balancing calculator to determine a layer jump start position and output said layer distance balancing signal if the magnitude of wobble is larger than said set value.

15. The layer jump control method of a high-speed optical drive as claimed in claim 14, wherein said optical drive is a DVD drive.

16. The layer jump control method of a high-speed optical drive as claimed in claim 14, wherein said layer jump start position is a gradual position of wobble period near said peak value.

17. The layer jump control method of a high-speed optical drive as claimed in claim 16, wherein said gradual position is three fourths of said peak value.

18. The layer jump control method of a high-speed optical drive as claimed in claim 14, wherein said layer jump start position is a gradual position of wobble period near said bottom value.

19. The layer jump control method of a high-speed optical drive as claimed in claim 18, wherein said gradual position is three fourths of said bottom value.

20. The layer jump control method of a high-speed optical drive as claimed in claim 14 further comprising the steps of:
using said controller to receive a focusing error signal produced by said preamplifier to produce a focusing control signal; and
transmitting said focusing control signal to said low-pass filter.

21. The layer jump control method of a high-speed optical drive as claimed in claim 14, wherein said layer jump process further comprising the steps of:
producing a kicking process according to a kicking signal and said layer distance balancing signal;

producing a holding process according to said layer distance balancing signal;

producing a braking process according to a braking signal and said layer distance balancing signal; and producing a waiting process according to said layer distance balancing signal.

* * * * *